US011756065B2

United States Patent
Ranjan et al.

(10) Patent No.: US 11,756,065 B2
(45) Date of Patent: Sep. 12, 2023

(54) METHODS AND APPARATUS FOR PREDICTING A USER CHURN EVENT

(71) Applicant: Walmart Apollo, LLC, Bentonville, AR (US)

(72) Inventors: Ashish Ranjan, Sunnyvale, CA (US); Aysenur Inan, Mountain View, CA (US); Sooraj Mangalath Subrahmannian, San Jose, CA (US); Divya Chaganti, San Jose, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 17/570,087

(22) Filed: Jan. 6, 2022

(65) Prior Publication Data

US 2023/0214869 A1    Jul. 6, 2023

(51) Int. Cl.
*G06Q 30/02* (2023.01)
*G06Q 30/0211* (2023.01)
*G06Q 30/0204* (2023.01)
*G06Q 30/0226* (2023.01)

(52) U.S. Cl.
CPC ..... *G06Q 30/0211* (2013.01); *G06Q 30/0205* (2013.01); *G06Q 30/0226* (2013.01)

(58) Field of Classification Search
CPC .......... G06Q 30/0211; G06Q 30/0205; G06Q 30/0226
See application file for complete search history.

(56) References Cited

U.S. PATENT DOCUMENTS

| | | | |
|---|---|---|---|
| 8,712,828 B2 | 4/2014 | Maga et al. | |
| 10,482,491 B2 | 11/2019 | Li et al. | |
| 2003/0200135 A1 | 10/2003 | Wright | |
| 2017/0221090 A1 | 8/2017 | Li et al. | |
| 2019/0102820 A1 | 4/2019 | Gupta | |
| 2019/0213511 A1 | 7/2019 | Higgins et al. | |
| 2019/0333092 A1 | 10/2019 | Goyal et al. | |

(Continued)

OTHER PUBLICATIONS

"Understanding different high risk groups by using SHAP values, but not just SHAP values" (Xiang, Shuyang published on Aug. 23, 2021 at medium.com at https://medium.eom/@vanillaxiangshuyang/understanding-different-high-risk-groups-by-using-shap-values-but-not-just-shap-values-358eb6f815da) (Year: 2021).*

(Continued)

*Primary Examiner* — James M Detweiler
(74) *Attorney, Agent, or Firm* — Morgan, Lewis & Bockius LLP; Manita Rawat

(57) ABSTRACT

In some examples, a system may be configured to obtain a set of features of a set of users including one or more features of transaction of the set of users and one or more features of engagement data of the set of users. Additionally, the system may be configured to implement a first set of operations that generate output data including a plurality of churn scores, based on the set of features. In some examples, each churn score of the plurality of churn scores being associated with a particular user of the set of users and characterize a likelihood of a churn event of the corresponding user.

18 Claims, 6 Drawing Sheets

(56) References Cited

U.S. PATENT DOCUMENTS

| | | | |
|---|---|---|---|
| 2019/0347675 A1 | 11/2019 | Yang et al. | |
| 2020/0134648 A1* | 4/2020 | Qi | G06Q 30/0207 |
| 2020/0167798 A1 | 5/2020 | Lee et al. | |
| 2020/0242640 A1 | 7/2020 | Nielsen et al. | |
| 2020/0267449 A1* | 8/2020 | Hoffman | H04N 21/25866 |
| 2020/0273050 A1* | 8/2020 | Doherty | G06Q 30/02 |
| 2021/0182956 A1 | 6/2021 | Rao | |
| 2022/0004885 A1* | 1/2022 | Yamada | A61B 5/021 |
| 2023/0094635 A1* | 3/2023 | Meng | G06N 5/01 |
| | | | 705/7.29 |

OTHER PUBLICATIONS

"Understanding different high risk groups by using SHAP values, but not just SHAP values" (Xiang, Shuyang published on Aug. 23, 2021 at medium.com at https://medium.com/@vanillaxiangshuyang/understanding-different-high-risk-groups-by-using-shap-values-but-not-just-shap-values-358eb6f815da) (Year: 2021).*

"Deep Learning for Customer Churn Prediction" (McDonnell, Matt; published on May 19, 2015 at Moz.com at https://moz.com/devblog/deep-learning-for-customer-churn-prediction) (Year: 2015).*

"Demystifying Black-Box Models with SHAP Value Analysis" (published on May 15, 2018 at datasciencecentral.com at https://www.datasciencecentral.com/demystifying-black-box-models-with-shap-value-analysis/) (Year: 2018).*

\* cited by examiner

METHODS AND APPARATUS FOR PREDICTING A USER CHURN EVENT

TECHNICAL FIELD

The disclosure relates to methods and apparatuses for predicting a user churn event.

BACKGROUNDS

At least some e-commerce entities may provide different platforms to enable customers to place orders or purchase items the e-commerce entities provide. In various examples, such platforms may include, an online platform, such as retailer websites, as well as an in-store platform. Generally, an e-commerce entity may provide incentives to its customers, such as free shipping and/or discounts for particular items. Additionally, such an e-commerce entity may provide loyalty or membership programs that, upon joining, may enable the customer to have access to such incentives. Further, the e-commerce entity may provide a trial loyalty or membership program that enables non-member customers to try such loyalty or membership programs for a predetermined period of time. Such trial loyalty or membership programs may have limited access to such incentives (e.g., partial access or less discounted rates compared to the full membership or loyalty program).

Over time, an e-commerce entity may have customers explicitly cancel their respective loyalty or memberships programs of the e-commerce entity or let their respective loyalty or membership programs lapse without renewal. Conventionally, such e-commerce entities may provide a system that transmits promotional content or content including content items promoting various incentives or benefits specific to customers that are currently participating in these loyalty or membership programs. Such content or content items may help retain customers in their respective loyalty or membership programs. However, such systems and processes treat all customers of the loyalty or membership program equally, without any consideration for whether a particular customer is more likely to cancel their loyalty or membership program or let their loyalty or membership program lapse without renewal, than another customer. Additionally, such conventional systems and process may not take into account particular user specific metrics when generating and transmitting content and/or content items to such customers of the loyalty and membership program. As such, the content and/or content items may not apply to some of the customers and may be ignored, resulting in wasted computing resources, or decrease the experience of the customers with the e-commerce entity.

SUMMARY

The embodiments described herein are directed to a computing system that determines/predicts, for each user or customer of an e-commerce entity, a likelihood of an occurrence of a user cohort event. In various examples, a user cohort event may include, for a particular user of an online e-commerce platform, the explicit cancelling of their respective membership program before the end of the membership program period. Additionally, the cohort may include, for a particular user of an online e-commerce platform, allowing their respective membership program to lapse or expire without renewing their membership program by the end of the membership program period. Additionally, the computing system may also determine factors or parameters that contributed to such a determination/prediction. Further, the computing system may utilize such determinations and predictions to determine which full-membership customers or user to communicate promotional content items (e.g., content items that promote or encourage the particular user or customer to renew or stay with their respective membership/loyalty program) to and what specific promotional content items to communicate to the full-membership customers or users (e.g., the computing system may, for a full-membership user or customer that doesn't utilize or underutilizes scheduled deliveries, communicate content items related to a coupon for scheduled deliveries). Such a computing system may leverage data that is already obtained and received by other computing systems of the e-commerce entity, such as computing systems associated with the online platform of the e-commerce entity or the transactional or payment computing systems of an associated store, to make such determinations/predictions, to make such determinations and prediction.

In accordance with some embodiments, exemplary computing systems may be implemented in any suitable hardware or hardware and software, such as in any suitable computing device. In some embodiments a system may include a memory resource storing instructions and one or more processors coupled to the memory resource. In some examples, the one or more processors may be configured to execute the instructions to obtain a set of features of a set of users including one or more features of transaction of the set of users and one or more features of engagement data of the set of users. Additionally, the one or more processors may be configured to execute the instructions to, implement a first set of operations that generate output data including a plurality of churn scores, based on the set of features. In some examples, each churn score of the plurality of churn scores being associated with a particular user of the set of users and characterize a likelihood of a churn event of the corresponding user. Moreover, the one or more processors may be configured to execute the instructions to, based on the output data and multiple churn cohorts, sort a user identifier of each of the set of users into one of the multiple churn cohorts. In some examples, each of the multiple churn cohorts representing one of multiple predetermined range of churn scores. Further, the one or more processors may be configured to execute the instructions to for at least a first churn cohort of the multiple churn cohorts, implement a second set of operations that generate explainability data associated with the first churn cohort.

In other embodiments, a computer-implemented method is provided that includes obtaining a set of features of a set of users including one or more features of transaction of the set of users and one or more features of engagement data of the set of users. Additionally, the computer-implemented method includes implementing a first set of operations that generate output data including a plurality of churn scores, based on the set of features. In some examples, each churn score of the plurality of churn scores being associated with a particular user of the set of users and characterize a likelihood of a churn event of the corresponding user. Moreover, the computer-implemented method includes, based on the output data and multiple churn cohorts, sort a user identifier of each of the set of users into one of the multiple churn cohorts. In some examples, each of the multiple churn cohorts representing one of multiple predetermined range of churn scores. Further, the computer-implemented method includes, for at least a first churn cohort of the multiple churn cohorts, implement a second set of operations that generate explainability data associated with the first churn cohort.

In various embodiments, a non-transitory computer readable medium has instructions stored thereon, where the instructions, when executed by the at least one or more processors, cause a system to, obtain a set of features of a set of users including one or more features of transaction of the set of users and one or more features of engagement data of the set of users. Additionally, the system may be configured to, implement a first set of operations that generate output data including a plurality of churn scores, based on the set of features. In some examples, each churn score of the plurality of churn scores being associated with a particular user of the set of users and characterize a likelihood of a churn event of the corresponding user. Moreover, the system may be configured to, based on the output data and multiple churn cohorts, sort a user identifier of each of the set of users into one of the multiple churn cohorts. In some examples, each of the multiple churn cohorts representing one of multiple predetermined range of churn scores. Further, the system may be configured to execute the instructions to for at least a first churn cohort of the multiple churn cohorts, implement a second set of operations that generate explainability data associated with the first churn cohort.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
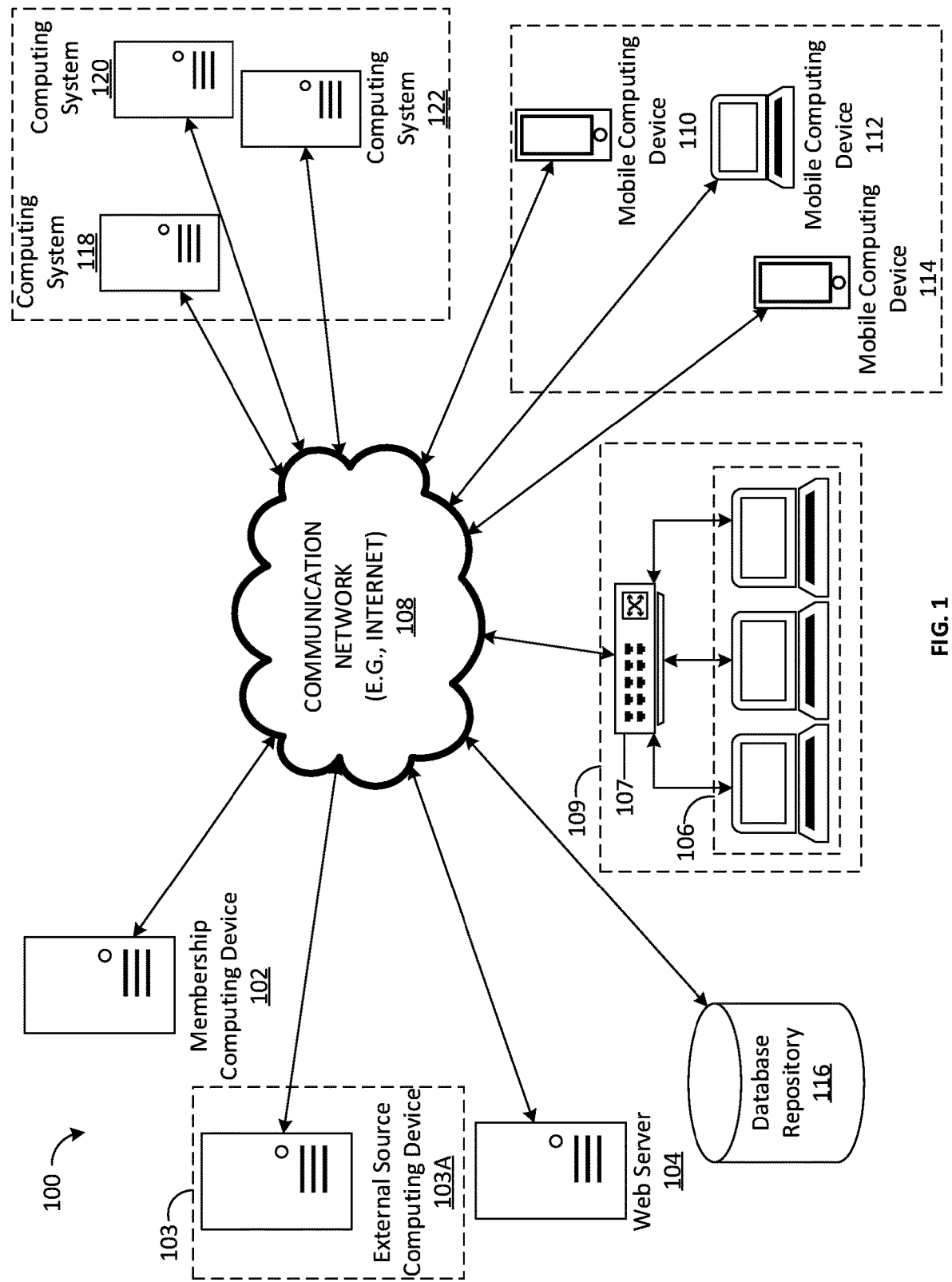
FIG. 1 is a block diagram of an example membership system that includes a membership computing device.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example membership system 100 that includes membership computing device 102 (e.g., a server, such as an application server), external source system 103, a web server 104, data repository 116, multiple customer mobile computing devices 110, 112, and 114, and multiple computing systems 118, 120, and 122 operatively coupled over communication network 108. Membership computing device 102, web server 104, multiple customer mobile computing devices 110, 112, and 114, and multiple computing systems 118, 120, and 122 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, membership computing device 102 can be a computer, a workstation, a laptop, a server such as a cloud-based server, or any other suitable device. In some examples, each of multiple customer mobile computing devices 110, 112, and 114 can be a cellular phone, a smart phone, a tablet, a personal assistant device, a voice assistant device, a digital assistant, a laptop, a computer, or any other suitable device. In some examples, membership computing device 102 is operated by a retailer, and multiple customer mobile computing devices 110, 112, and 114 are operated by customers of the retailer.

Although FIG. 1 illustrates three customer mobile computing devices 110, 112, and 114, membership system 100 can include any number of customer mobile computing devices 110, 112, 114. Additionally, even though FIG. 1 illustrates three computing systems 118, 120, and 122, membership system 100 can include any number of computing systems 118, 120, and 122 that are associated with a particular activations system. Similarly, membership system 100 can include any number of membership computing device 102, web server 104, and data repository 116.

Membership system 100 may include workstation(s) 106. Workstation(s) 106 are operably coupled to communication network 118 via router (or switch) 107. Workstation(s) 106 and/or router 107 may be located at particular store associated with membership system 100, such as a store 109. Workstation(s) 106 can communicate with membership computing device 102 over communication network 108. Workstation(s) 106 may send data to, and receive data from, membership computing device 102. In some examples, workstation(s) 106 may transmit purchase data related to orders purchased by customers at a particular store, such as store 109, to membership computing device 102. In other examples, workstation(s) 106 may transmit benefit data associated with a particular store, such as store 109, to membership computing device 102. In some examples benefit data may characterize one or more membership benefits that are provided by the particular store, and that are available to customers or are accessible to customers, such as scan and go and fuel discounts. Further, membership computing device 102 may store in data repository 116, data characterizing, membership benefits that are available or accessible to the particular store (e.g., scan and go capabilities, fuel pumps and associated fuel discounts, etc.), within a corresponding data repository 116, such as benefit data. Additionally, membership computing device 102 may also store a store identifier of the store, such as an alphanumeric identifier, and geolocation data of the store, such as an address and/or longitudinal and latitudinal coordinates, within a corresponding data repository 116, such as membership data.

In various examples, workstation(s) 109 may transmit store data of a particular store, such as store 109. In such examples, store data may indicate store features or characteristics of a particular store. For example, a store feature of the particular store, such as store 109, may include that the particular store is "scan and go" capable (e.g., a customer at store 109 may utilize an application program executing on their respective mobile device to scan an item and purchase an item without needing to go to a physical cashier). In another example, a store feature of the particular store may include that the particular store is pickup capable (e.g., the particular store is associated with services that allows customers to order items for a future time interval, at which the customer can come to the particular store to pick up their orders). In yet another example, a store feature of the particular store may include that the particular store has one or more available fuel stations. Further, membership computing device 102 may store in data repository 116, data characterizing, the store features or characteristics of the particular store, such as store 109, within a corresponding data repository 116, such as store data.

In various implementations, membership computing device 102 may determine one or more membership benefits that are available to a particular store, such as store 109, or accessible for customers of the particular score, based on store data of the particular store. For example, membership computing device 102 may compare the store features indicated by store data of a particular store and all the membership benefits that are provided by the associated e-commerce entity. Additionally, membership computing device 102 may determine which membership benefits may be available for the particular store based on which store features match the membership benefits that are provided by the associated e-commerce entity. For instance, membership computing device 102 may determine that fuel discounts (the membership benefits) are available to store 109 because store 109 has available fuel pumps. In such an example, the e-commerce entity, may, from another system or database (not shown in FIG. 1), transmit benefit data identifies all the membership benefits that are provided by the e-commerce entity. Further, membership computing device 102 may store in data repository 116, data characterizing, membership benefits that are available or accessible to a particular store, such as store 109, within a corresponding data repository 116, such as membership data.

In some implementations, membership computing device 102 may determine whether a customer or a user of e-commerce entity is currently participating or not participating in a loyalty or membership program. In some examples, membership data generated by an additional computing system of the e-commerce entity (not shown in FIG. 1) may include data identifying a plurality of users or customers of the e-commerce entity that are currently or have previously participated in the loyalty or membership program. Additionally, elements of the data may include, but are not limited to, a unique identifier of a particular one of the customers of the e-commerce entity that has currently or previously participated in the loyalty or membership program (e.g., an alphanumeric identifier or login credential, a customer name, etc.), a label or tag identifying whether the particular customer is currently or previously a full member, a timestamp indicating when the user joined the loyalty or membership program, information identifying the age of the full-membership, information identifying the sign up tenure type (e.g., annual or monthly), information identifying the full-membership plan type (e.g., delivery unlimited, in-home deliver, etc.), information identifying the remaining amount of time of a currently active membership of the particular customer, information identifying whether the particular one of the customers cancelled their respective loyalty or membership program, and a corresponding cancellation tag or label indicating whether the customer explicitly cancelled or let their full-membership lapse.

Further, membership computing device 102 may determine which customers or users of e-commerce entity is currently participating in a full loyalty or membership program (e.g., current full-membership users) based on the membership data and the current time and/or date. For example, membership computing device 102 may determine that the current time and/or date is Nov. 15, 2021. Additionally, for a particular user identified in the membership data, membership computing device 102 may determine that the particular user joined a full-membership loyalty or membership program on Nov. 14, 2021 and that the type of full loyalty or membership program is monthly, based on membership data of the particular user. Based on the current time and/or data and the membership data of the particular user, membership computing device 102 may determine that the particular user is currently (or at least on Nov. 15, 2021) participating in the full loyalty or membership program. Further, membership computing device 102, may store data identifying the full-membership users within corresponding data repository 116, such as membership data. Such data may be updated periodically, such as daily, so that membership data is up to date.

Membership computing device 102 may determine which customers or users of e-commerce entity is not currently participating in the full loyalty or membership program and whether the customers or users converted or cancelled their full-membership programs, based on the membership data of the customers or users. Further, based on the membership data of the customers or users, membership computing device 102 may determine, for full-membership users or customers, whether the full-membership users or customers explicitly cancelled their full-membership or let their full-membership lapse.

Although FIG. 1 illustrates a single store 109, membership system 100 may include any number of stores, including store 109. Additionally, each store may include a computing system comprising workstations similar to workstation(s) 106. In implementations where membership system 100 includes multiple stores 109, data transmitted to membership computing device 102 may include identifying information associated with a particular store 109. For example, workstation 106 of a particular store 109 may transmit membership data and/or store data of the particular store 109 to membership computing device 102. Additionally, workstation(s) 106 may each transmit location data (e.g., an address, geographical coordinates, etc.) and/or a stored identifier associated with and/or corresponding to the particular store 109, to membership computing device 102.

In some examples, membership computing device 102 may determine which of the one or more stores 109 associated with an e-commerce entity, a particular users or customer purchases items from. In such example, the transaction data of a particular user/customer may, for each order or purchase order, include one or more elements identifying a location (e.g., an address, geographical coordinates, etc.) and/or a stored identifier associated with and/or corresponding to the particular store 109. Based on such data elements, membership computing device 102 may generate data identifying particular stores 109 the particular customer/user has purchased from. Further, membership computing device 102 may determine and generate such data elements for each of the full-membership users. For example, based on each user identifier identified in the membership data and associated transaction data, membership computing device 102 may generate data identifying, for each full-membership users, particular stores 109 the associated user/customer has purchased from along with user identifiers of each of the associated full-membership users. In such an example, membership computing device 102 may store, data identifying, for each full-membership users, particular stores 109 the associated user/customer has purchased from, within a user database, such as membership data.

Web server 104 may host one or more web pages, such as a retailer's website. The website may allow for the purchase of items. Web server 104 may transmit transaction data related to orders purchased on the website by customers to membership computing device 102. In some examples, membership computing device 102 may, in response to and based on the received transaction data, each of the one or more orders to determine one or more items purchased in each of the one or more orders and a corresponding customer. Further, membership computing device 102 may store in data repository 116, data characterizing each of the one or more orders, the corresponding customer (e.g., by customer or visitor ID), the corresponding one or more items, and the associated item type within a corresponding data repository 116, such as transaction data.

In some examples, web server 104 transmits user session data to membership computing device 102. The user session data identifies events associated with browser sessions and may include user interaction or engagement data characterizing events such as, add-to-cart, click events, view events, and impressions associated with a corresponding user. Additionally, in response to and based on receiving user session data, membership computing device 102 may determine add-to-to cart events, click events, view events, and impressions associated with a corresponding user. Further, membership computing device 102 may store in data repository 116, data characterizing add-to-to cart events, click events, view events, and impressions associated with a corresponding customer, within a corresponding data repository 116, such as engagement data.

First customer mobile computing device 110, second customer mobile computing device 112, and $N^{th}$ mobile computing device 114 may communicate with web server 104 over communication network 108. For example, each of multiple mobile computing devices 110 and 112 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple mobile computing devices 110, 112 may access the website and perform a search for items on the website by entering in one or more terms into the search bar. In response, the website may return search results identifying one or more items, as described above and further herein. Web server 104 may also transmit search query data to membership computing device 102. The search query data may identify, for each user/customer, a search query provided by the customer as well as the associated returned search results.

In other examples, a server (not shown in FIG. 1) may support and maintain an application program associated with the e-commerce entity, that can be executed on a mobile computing device (mobile computing device 110, 112, 114) of a customer/user of the e-commerce entity. Additionally, the application program may allow for the purchase of items provided by the e-commerce entity. Further, the application program, via the server, may transmit transaction data related to orders purchased on the application program by customers to membership computing device 102. In some examples, membership computing device 102 may, in response to and based on the received transaction data of each of the one or more orders, determine one or more items purchased in each of the one or more orders and a corresponding customer. Further, membership computing device 102 may store in data repository 116, data characterizing each of the one or more orders, the corresponding customer (e.g., by customer or visitor ID), the corresponding one or more items, and the associated item type within a corresponding data repository 116, such as transaction data.

In some examples, the server may transmit user session data to membership computing device 102. The user session data identifies events associated with sessions of the application program and may include user interaction or engagement data characterizing events such as, add-to-cart, click events, view events, and impressions associated with a corresponding user. Additionally, in response to and based on receiving user session data, membership computing device 102 may determine add-to-to cart events, click events, view events, and impressions associated with a corresponding user. Further, membership computing device 102 may store in data repository 116, data characterizing add-to-to cart events, click events, view events, and impressions associated with a corresponding customer, within a corresponding data repository 116, such as engagement data.

Membership computing device 102 is operable to communicate with data repository 116 over communication network 118. For example, membership computing device 102 can store data to, and read data from, data repository 116. Data repository 116 can be a remote storage device, such as a cloud-based server, a disk (e.g., a hard disk), a memory device on another application server, a networked computer, or any other suitable remote storage. Although shown remote to membership computing device 102, in some examples, data repository 116 can be a local storage device, such as a hard drive, a non-volatile memory, or a USB stick. Membership computing device 102 may store purchase/transaction data, store data, and membership data received from store 109, web server 104, and/or server of an application program executing on a mobile computing device (e.g., mobile computing device 110, 112, 114) in data repository 116. Membership computing device 102 may also store user session data identifying events associated with browsing sessions, such as when a customer browses a website hosted by web server 104 and/or when the customer interacts with the application program executing on the mobile computing device (e.g., mobile computing device 110, 112, 114) of the customer. In some examples, the user session data may include user interaction or engagement data characterizing events, such as, add-to-cart events, click events, view events, search query data, and impressions associated with a corresponding customer. In various examples, the user session data may identify events associated with browsing sessions of webpages or interactions with an application program associated with a membership or loyalty program (e.g., user interaction or engagement data obtained from browsing sessions of pages associated with a membership or loyalty program characterizing events, such as, add-to-cart events, click events, view events, search query data, and impressions associated with a corresponding customer).

In some examples, data repository 116 may store supplemental user data generated by external source computing device 103A of external source system 103. In some instances, the elements of the supplemental user data for a particular one of the customers of the e-commerce entity may include, but are not limited to, a unique identifier of the particular customer (e.g., an alphanumeric identifier or login credential, a customer name, etc.), information identifying one or more vehicles currently or previously held by the particular customer, information identifying one or more occupations current or previously held by the particular customer, information identifying the educational level of the particular customer, and information identifying one or more features of the customer, such as the age of the customer.

In some examples, data repository 116 may store one or more machine learning models that, when adaptively trained and validated, may be executed by membership computing device 102 to determine and generate output data associated with a particular user or customer labeled or designated as a current full-membership user (e.g., a user or customer of the e-commerce entity tagged or labeled as currently participating in a full loyalty or membership program). The output data may include a plurality of churn scores. Each churn score of the plurality of churn scores may be associated with a particular current full-membership user and may characterize a likelihood of an occurrence of a user churn event. Further, the output data may include data identifying, for each churn score, whether, the churn event is associated with the particular current full-membership user, explicitly cancelling their respective full membership or cancellation of the full-membership due to the corresponding membership not being renewed before the corresponding membership period expired. Additionally, membership computing device 102 may implement operations that generate the output data by applying a trained and validated machine learning model (e.g., neural network based or multilayer perceptron based) to one or more extracted, derived, or obtained features or data. In various examples, the features or data may be extracted, obtained or derived from one or more elements of transaction data, engagement data, supplemental user data, membership data, benefits data and/or store data.

In some examples, additional extracted, derived or obtained features or data that may be ingested by the trained and validated machine learning model to generate the output data includes, consolidated data. In such examples, membership computing device 102 may determine and generate, from one or more elements of transaction data and for each user/customer of an e-commerce entity, consolidated data. In some instances, one or more elements of consolidated data may include, but are not limited to, total number of transactions of a particular one of the customers of the e-commerce entity during the full-membership period, total amount spent on purchases by the particular customer during the full-membership period, average amount spent on purchases by the particular customer, for every predetermined time interval (e.g., a month, two months, three months) and during the full-membership period, time-average number of items purchased by the particular customer during the full-membership period. Further, membership computing device 102 may store in data repository 116, the consolidated data, within a corresponding data repository 116, such as consolidated data. In various implementations, each of the data elements may further be associated with information contextual information (e.g., the particular element is associated with the e-commerce website, the application program, or even a particular service, such as a grocery service).

In other examples, additional extracted, derived or obtained features or data that may be ingested by the trained and validated machine learning model to generate the output data includes, fulfillment data. In such examples, membership computing device 102 may determine and generate, from one or more elements of transaction data and for each user/customer of an e-commerce entity, fulfillment data. Fulfillment data may indicate how the purchase order of the particular one of the customers of the e-commerce entity was fulfilled (e.g., scheduled delivery, scheduled pick up, etc.), the total and/or time-average amount spent on purchases by the particular customer and associated with a completed scheduled delivery, the total an/or time-average amount spent on purchases by the particular customer and associated with a completed scheduled pickup, the total and/or time-average number of items purchased by the particular customer and associated with a completed scheduled delivery, the total and/or time-average number of items purchased by the particular customer and associated with a completed scheduled pickup, the total and/or time-average amount spent on purchases by the particular customer and associated with a cancelled scheduled delivery, the total an/or time-average amount spent on purchases by the particular customer and associated with a cancelled scheduled pickup, the total and/or time-average number of items purchased by the particular customer and associated with a cancelled scheduled delivery, the total and/or time-average number of items purchased by the particular customer and associated with a cancelled scheduled pickup, ratio of scheduled deliveries to scheduled pickups, and cancellation ratio per purchase. Further, membership computing device 102 may store in data repository 116, the fulfillment data, within a corresponding data repository 116, such as fulfillment data.

In various examples, additional extract, derived or obtained features or data that may be ingested by the trained and validated machine learning model to generate the output data includes, inter-purchase interval data. In such examples, membership computing device 102 may determine and generate, from one or more elements of transaction data and for each user/customer of an e-commerce entity, inter-purchase interval data. Inter-purchase interval data may indicate the average number of days in-between each purchase made between the particular one of the customers of the e-commerce entity and the e-commerce entity (e.g., in-store and/or online). Further, membership computing device 102 may store in data repository 116, the inter-purchase interval data, within a corresponding data repository 116, such as inter-purchase interval data In some examples, membership computing device 102 may determine and generate explainability data associated with output data generated by a trained and validated machine learning model that generated the output data. Explainability data may include a set of values and the set of values may include multiple subsets of values. Each subset of values may be associated with one of the extracted features or data that were inputs to the trained and validated machine learning model. Moreover, each value of a subset of values may be associated with a particular current full-membership user, and may characterize a contribution of the corresponding feature to the output data generated by the trained and validated machine learning model. In some examples, each value may each indicate the magnitude of the contribution the corresponding feature may have had on the output generated by the trained and validated machine learning model. Additionally, each value may indicate whether such contribution may have had a negative or positive contribution to the generated output data. In other examples, membership computing device 102 may implement a set of operations that generate the explainability data. In some instances, membership computing device 102 may apply a SHAP model to the trained and validated machine learning model. Further, membership computing device 102 may store in data repository 116, the explainability data, within a corresponding data repository 116, such as explainability data.

In various implementations, membership computing device 102 may generate explainability data for current full-membership users that are more likely to churn or cancel their respective memberships, either by explicitly cancelling before the end of the membership period or by allowing their memberships to lapse and not renew their memberships by the end of the membership period. In such implementations, membership computing device 102 may, for each current full-membership user of the e-commerce entity, associate with or place into one of a set of bins/cohorts, based on the churn score of the corresponding current full-membership user or customer. Each bin/cohort may correspond to a predetermined range of churn scores. For example, a cohort of 0.0-0.099 may correspond to current full-membership users with a determined churn score ranging between 0.0-0.099; a cohort of 0.1-0.199 may correspond to current full-membership users with a determined churn score ranging between 0.1-0.199; a cohort of 0.2-0.299 may correspond to current full-membership users with a determined churn score ranging between 0.2-0.299; a cohort of 0.3-0.399 may correspond to current full-membership users with a determined churn score ranging between 0.3-0.399; a cohort of 0.4-0.499 may correspond to current full-membership users with a determined churn score ranging between 0.4-0.499; a cohort of 0.5-0.599 may correspond to current full-membership users with a determined churn score ranging between 0.5-0.599; a cohort of 0.6-0.699 may correspond to current full-membership users with a determined churn score ranging between 0.6-0.699; a cohort of 0.7-0.799 may correspond to current full-membership users with a determined churn score ranging between 0.7-0.799; a cohort of 0.8-0.899 may correspond to current full-membership users with a determined churn score ranging between 0.8-0.899; and a cohort of 0.9-1.0 may correspond to current full-membership users with a determined churn score ranging between 0.9-1.0. Further, and in such implementations, membership computing device 102 may generate explainability data for current full-membership users in bins/cohorts which a predetermined range of churn scores above 0.5 or (50%). Additionally, membership computing device 102 may store in data repository 116, the explainability data, within a corresponding data repository 116, such as explainability data.

In some examples, membership computing device 102 may implement a set of operations that determine and generate explainability data for a particular bin/cohort. For example, membership computing device 102 may determine explainability data for a cohort of 0.6-0.699. Additionally, the explainability data may include a set of values associated with output data including churn scores ranging between 0.6-0.699 and the set of values may include multiple subsets of values. Each subset of values may be associated with one of the extracted features or data that were inputs to the trained and validated machine learning model. Moreover, each value of a subset of values may be associated with a particular current full-membership user with a churn score within the range of 0.6-0.699, and may characterize a contribution of the corresponding feature to the generated churn scores ranging between 0.6-0.699. In some examples the values may each indicate the magnitude of the contribution the corresponding feature may have had on such churn scores, as well as whether such contribution may have had a negative or positive contribution to such churn scores. In some instances, membership computing device 102 may apply a SHAP model to the trained and validated machine learning model that generated output data associated with a particular bin/cohort, such as a bin/cohort that corresponds to a churn score ranging from 0.6-0.699. Further, membership computing device 102 may store in data repository 116, the explainability data, within a corresponding data repository 116, such as explainability data.

In some examples, membership computing device 102 may implement a set of operations that determine and generate explainability data for a particular current full-membership user/customer. For example, membership computing device 102 may determine explainability data for a particular current full-membership user/customer with output data including a churn score of 0.85. Additionally, the explainability data may include a set of values associated with the output data of the particular full membership customer. Moreover, each value of the set of values may be associated with each of the extracted features or data that were inputs to the trained and validated machine learning model that generated the churn score of the particular user. In such an example, the extracted features or data may be associated with the particular current full-membership user (e.g., extracted features of transaction data associated with the particular current full-membership user). Further, each value may characterize a contribution of the corresponding feature or data to the generated churn score associated with the particular user. In some examples the values may each indicate the magnitude of the contribution the corresponding feature may have had on the churn score associated with the particular user, as well as whether such contribution may have had a negative or positive contribution to the churn score associated with the particular user. In some instances, membership computing device 102 may apply a SHAP model to the trained and validated machine learning model that generated output data including the churn score associated with the particular user. Further, membership computing device 102 may store in data repository 116, the explainability data, within a corresponding data repository 116, such as explainability data. In various examples, the particular current full-membership user may be associated with a particular bin/cohort. For example, the particular current full-membership user may have an associated output data including a churn score of 0.85. Further, the churn score of 0.85 of the particular current full-membership user may be put into or be associated with a bin/cohort corresponding to a churn score range of 0.8-0.899.

For each feature and associated values of explainability data, membership computing device 102 may, for a particular one of current full-membership users of an e-commerce entity, determine whether to implement operations associated with an actionable feature. As described herein, an actionable feature, is an extracted, derived, or obtained feature of the particular current full-membership user that, are modifiable through operations implemented by the membership computing device 102. Additionally, if the extracted, derived or obtained feature is modified, the modification of such feature may adjust (e., increase or decrease) a churn score of the particular current full-membership user. Examples of actionable features include, transactional and engagement type features or features that are extracted, obtained or derived from transaction and engagement data (e.g., consolidated data, fulfillment data, and inter-purchase interval data).

In some examples, membership system 100 may include multiple computing systems 118, 120 and 122 configured to implement operations associated with actionable features. In such examples, each of the multiple computing systems 118, 120 and 122 may be associated with a particular activations system. A particular activations system may be configured to implement a set of operations associated with one or more particular extracted, derived or obtained actionable feature.

In various examples, the set of operations that a particular activations system may implement, includes the generation and communication of instructions that cause an application executing on a mobile computing device of a particular current full-membership user to generate digital content associated with a particular actionable feature. In such examples, membership computing device 102 may transmit intervention data indicating that the particular activations system is to implement the set of operations associated with the particular actionable feature. In some instance, the digital content may include content items that promotes or encourages the current full-membership user to renew or continue their participation of their respective membership.

In other examples, the set of operations may include the generation and communication of instructions that cause a webpage or website, that a full-membership user may be browsing, to display digital content associated with a particular actionable feature. In such examples, membership computing device 102 may implement the set of operations cause the webpage or website to display such digital content. In such examples, such example operations may be based in part on additional data provided by one or more of the multiple computing systems 118, 120 and 122. In some instance, the digital content may include content items that promotes or encourages the current full-membership user to renew or continue their participation of their respective membership.

In some examples, membership computing device 102 may determine whether to implement operations associated with an actionable feature by comparing explainability data of the particular current full-membership user to the explainability data of a bin/cohort with a higher range of churn scores. Examples of operations that may be implemented by the membership computing device 102 include, triggering a notification on the mobile computing device (e.g., mobile computing device 110, 112, 114) of the current full-membership user that is related to the actionable feature, triggering communications, such as emails, to the mobile computing device (e.g., mobile computing device 110, 112, 114) of the current full-membership user that is related to the actionable feature, and causing a website/webpage of an associated e-commerce entity, that is displayed on the mobile computing device (e.g., mobile computing device 110, 112, 114) of the current full-membership user, to generate particular graphical features or content items (e.g., a banner) related to the actionable feature and/or the loyalty or membership program.

In some implementations, an analyst may be given data to analyze extracted, derived or obtained features and data of output data of particular full-membership users. In some examples, membership computing device 102 may determine that the churn event associated with the particular full-membership user may be associated with an explicit cancellation of their membership program prior to the end of their membership period, and may be more likely to churn or be associated with the churn event (e.g., a churn score greater than 0.5). In such examples, membership computing device 102 may determine the particular full membership user may have explicitly cancelled their membership program prior to the end of their membership period, based on a corresponding tag/label. Additionally, membership computing device 102 may transmit output data of the particular full-membership users along with the associated explainability data, the tag/label indicating the determined churn event is an explicit cancellation, and a user identifier of the particular full membership user, to a mobile computing device (not shown) operated by an analyst. The mobile computing device of the analyst may generate a graphical representation of the distribution of the set of values included in explainability data associated with that particular full-membership user. Based on the graphical representation, the analyst and/or the mobile computing device of the user may make one or more determinations as to which extracted and derived features and data of the particular full-membership user is contributing the most (negatively or positively) to the churn score of the particular full-membership user. As such, the analyst may further make determinations as to why the particular full-membership user is likely to churn.

In other examples, membership computing device 102 may determine that the churn event associated with the particular full-membership user may be associated with the respective membership program expiring or lapsing without renewing their membership by the end of the membership period, and may be more likely to churn or be associated with the churn event (e.g., a churn score greater than 0.5). In such examples, membership computing device 102 may determine that the churn event of the particular full membership user may be associated with their respective membership program expiring or lapsing without renewing their membership by the end of the membership period, based on a corresponding tag/label. Additionally, membership computing device 102 may transmit output data of the particular full-membership users along with the associated explainability data, a tag/label indicating the determined churn event is lapsing or expiring of the membership program without renewing their membership by the end of the membership period, and a user identifier of the particular full membership user, to a mobile computing device (not shown) operated by an analyst. The mobile computing device of the analyst may generate a graphical representation of the distribution of the set of values included in explainability data associated with that particular full-membership user. Based on the graphical representation, the analyst and/or the mobile computing device of the user may make one or more determinations as to which extracted and derived features and data of the particular full-membership user is contributing the most (negatively or positively) to the churn score of the particular full-membership user. As such, the analyst may further make determinations as to why the particular full-membership user is likely to churn.

In some examples, a mobile computing device of an analyst may generate a graphical representation of the distribution of extracted and/or derived features and data of all full-membership users that have churn scores below 0.5 (e.g., not likely to churn). In such examples, the graphical representation may display for each feature, feature values of the full-membership users that have churn scores below 0.5. Additionally, membership computing device 102 may transmit explainability data of all full-membership users with a churn score within 0 and 0.5, to the mobile computing device of the analyst. Further, the mobile computing device of the analyst may generate the graphical representation of the distribution of extracted and/or derived features and data of all full-membership users that have churn scores below 0.5 based on the received explainability data.

In other examples, a mobile computing device of an analyst may, for each of one or more bin/cohorts with corresponding churn score ranges within 0 and 0.5, a graphical representation of the distribution of extracted and/or derived features and data of full-membership users of the corresponding bin/cohort. In such examples, membership computing device 102 may transmit explainability data of full-membership users with a churn score within 0 and 0.5, along with data identifying one or more churn bins/cohorts with corresponding churn score ranges within 0 and 0.5 and associated full-membership users to the mobile computing device of the analyst. Further, membership computing device 102 may generate the graphical representations of the distribution of extracted and/or derived features and data of full-membership users of each churn bin/cohort, based on the received explainability data and data identifying the churn cohorts/bins.

Figure 2:
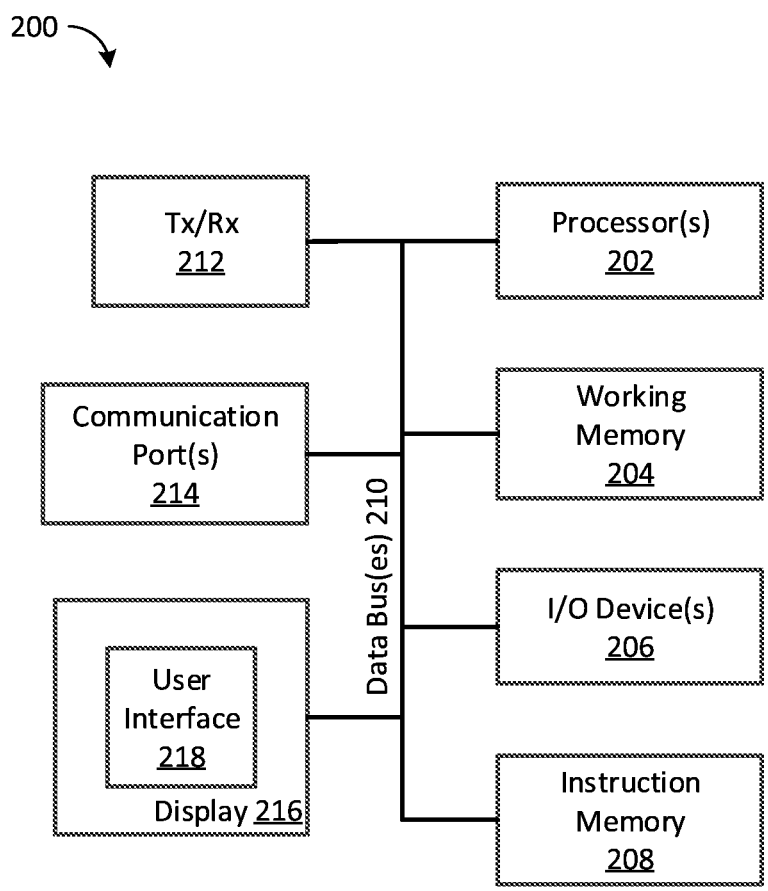
FIG. 2 illustrates a block diagram of example membership computing device of FIG. 1 in accordance with some embodiments.

FIG. 2 illustrates a block diagram of example membership computing device 102 of FIG. 1. Membership computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of membership computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with membership computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 membership computing device 102 will be operating in. Processor(s) 202 is operable to receive data from, or send data to, a network, such as communication network 108 of FIG. 1, via transceiver 212.

User Churn Event Prediction Determination

Figure 3:
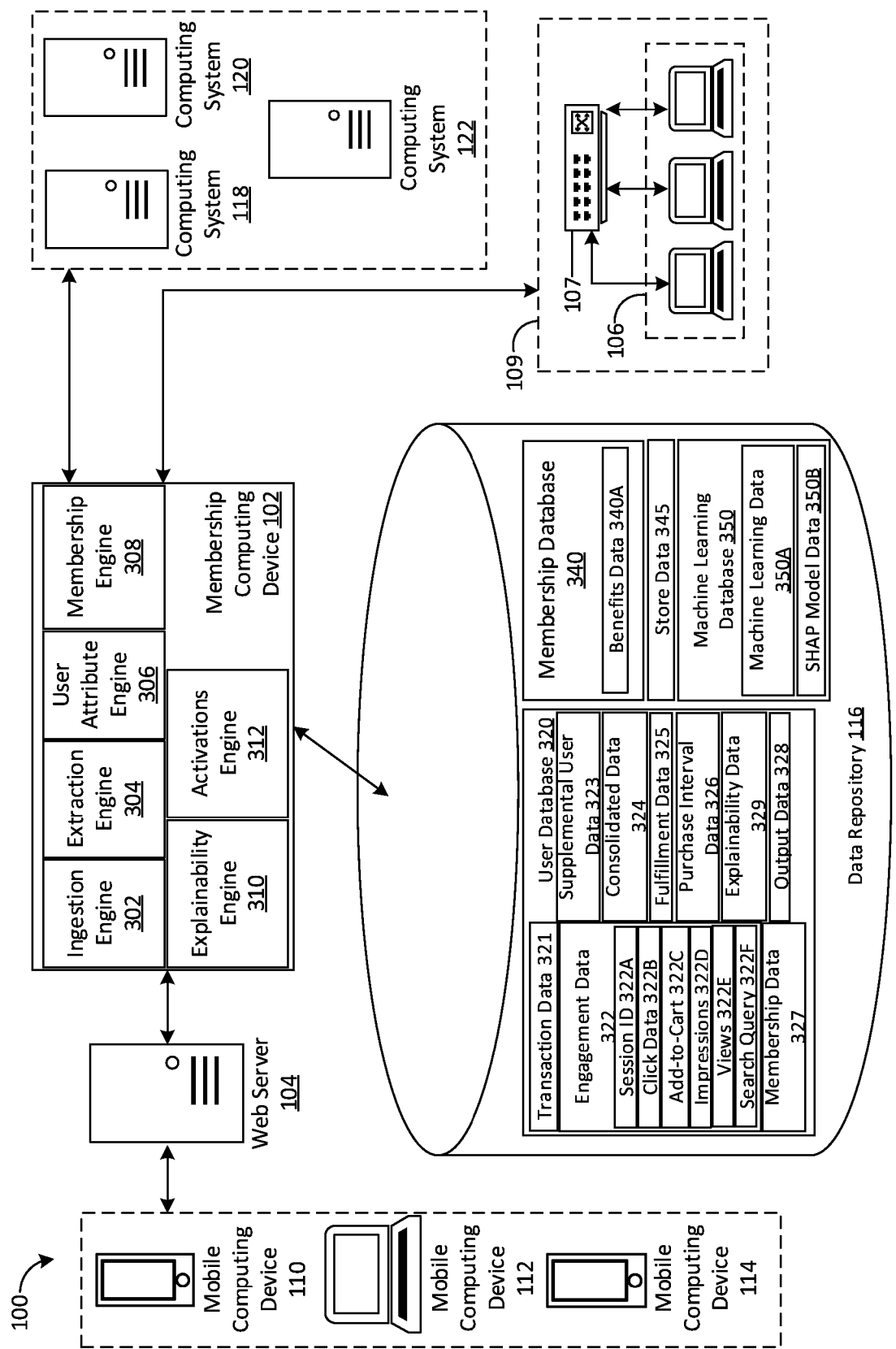
FIG. 3 is a block diagram illustrating examples of various portions of the membership computing device of FIG. 1 in accordance with some embodiments.

FIG. 3 is a block diagram illustrating examples of various portions of the membership computing device 102. As illustrated in FIG. 3, membership computing device 102 can include ingestion engine 302, extraction engine 304, user attribute engine 306, membership engine 308, and explainability engine 310. In some examples, one or more of ingestion engine 302, extraction engine 304, user attribute engine 306, membership engine 308, and explainability engine 310 may be implemented in hardware. In other examples, one or more of ingestion engine 302, extraction engine 304, user attribute engine 306, membership engine 308, and explainability engine 310 may be implemented as an executable program maintained in a tangible, non-transitory memory, such as instruction memory 208 of FIG. 2, that may be executed by one or processors, such as processor 202 of FIG. 2.

As illustrated in FIG. 3, data repository 116, may include user database 320. In some examples, user database 320 may store one or more data elements of user session data within user database 320. For example, membership computing device 102 may receive user session data from web server 104. Additionally, membership computing device 102, may execute ingestion engine 302 to obtain one or more elements of user session data and store the one or more elements of user session data within user database 320. In some examples, user session data may be related one or more browser sessions of a plurality of users of the online platform (e.g., the website hosted by web server 104) and/or one or more interactions with an application program of an e-commerce entity executing on a mobile computing device (e.g., mobile computing device 110, 112, 114) of a user/customer of the e-commerce entity. Additionally, user session data may include engagement data 322. Engagement data 322 includes a session ID 322A (i.e., a website browser session identifier), click data 322B identifying click events where the user clicked (e.g., images of items for purchase, keywords to filter reviews for an item) and corresponding timestamps of each click event, add-to-cart data 322C identifying add-to-cart events where the user adds an anchor item to an online shopping cart and corresponding timestamps of each event, impressions data 322D identifying one or more impressions associated with each user/customer of an e-commerce entity, views data 322E identifying view events of webpages the user viewed and corresponding timestamps of each view event, search query data 322F, and user ID data 322G (e.g., a customer ID, visitor ID, etc.) identifying a user ID for each of the plurality of customers of the online platform. In various implementations, each element of click data 322B, add-to-cart data 322C, impressions data 322D, views data 322E and/or search query data 322F may be linked or associated with a particular user ID 322G of a customer.

User database 320 may also store supplemental user data 323. In various implementations, membership computing device 102 may execute ingestion engine 302 to obtain, from external source computing device 103A of external source system 103, one or more elements of supplemental user data 323 and store the one or more elements of supplemental user data 323 within user database 320. In some examples, one or more elements of supplemental user data 323 for a particular one of the users/customers of the e-commerce entity may include but are not limited to, a unique identifier of the particular customer (e.g., an alphanumeric identifier or login credential, a customer name, etc.), information identifying one or more vehicles currently or previously held by the particular customer, information identifying one or more occupations current or previously held by the particular customer, information identifying the educational level of the particular customer, and information identifying one or more features of the customer, such as the age of the customer.

User database 320 may also store user transaction data 321. In some example, membership computing device 102 may receive in-store purchase data identifying and characterizing one or more purchases or purchase orders from one or more stores, such as store 109, associated with one or more user of the online platform. In other examples, membership computing device 102 may receive online purchase data from web server 104, which identifies and characterizes one or more online purchases or purchase orders from an online platform, such as a retailer's website hosted by web server 104. The one or more online purchases may be associated with of one or more users of the online platform. In various examples, membership computing device 102 may receive purchase data from a server (not shown in FIG. 3) that supports and maintains the application program of an e-commerce entity. In such examples, the application program may execute on a mobile computing device (e.g., mobile computing device 110, 112, 114) of a customer. Additionally, the application program may allow the customer to purchase one or more items provided by the e-commerce entity. The application program, via the server, may transmit purchase data related to items purchased on the application program by customers to membership computing device 102. In various implementations, membership computing device 102 may obtain in store-purchase data, online purchase data and/or purchase data from the application program of a particular time interval (e.g., a particular month, year, number of years, etc.). Executed ingestion engine 302 may parse in-store purchase data, online purchase data and the purchase data from the application program to generate transaction data 321 of each of the one or more users of the online platform within in user database 320.

User database 320 may also store consolidated data 324. In some examples, consolidated data 324 may be extracted and/or derived from transaction data 321. In some implementations, membership computing device 102 may execute user attribute engine 306 to determine and generate, for each user, consolidated data 324 from transaction data 321. In some examples, consolidated data 324 may include, but are not limited to, total number of transactions of a particular one of the customers of the e-commerce entity during the full-membership period, total amount spent on purchases by the particular customer during the full-membership period, average amount spent on purchases by the particular customer, for every predetermined time interval (e.g., a month, two months, three months) and during the full-membership period, time-average number of items purchased by the particular customer during the full-membership period.

User database 320 may also store fulfillment data 325. In some examples, fulfillment data 325 may be extracted and/or derived from transaction data 321. In some implementations, membership computing device 102 may execute user attribute engine 306 to determine and generate, for each user, fulfillment data 325 from transaction data 321. In some examples, fulfillment data 325 may indicate how the purchase order of the particular one of the customers of the e-commerce entity was fulfilled (e.g., scheduled delivery, scheduled pick up, etc.), the total and/or time-average amount spent on purchases by the particular customer and associated with a completed scheduled delivery, the total and/or time-average amount spent on purchases by the particular customer and associated with a completed scheduled pickup, the total and/or time-average number of items purchased by the particular customer and associated with a completed scheduled delivery, the total and/or time-average number of items purchased by the particular customer and associated with a completed scheduled pickup, the total and/or time-average amount spent on purchases by the particular customer and associated with a cancelled scheduled delivery, the total an/or time-average amount spent on purchases by the particular customer and associated with a cancelled scheduled pickup, the total and/or time-average number of items purchased by the particular customer and associated with a cancelled scheduled delivery, the total and/or time-average number of items purchased by the particular customer and associated with a cancelled scheduled pickup, ratio of scheduled deliveries to scheduled pickups, and cancellation ratio per purchase.

User database 320 may also store inter-purchase interval data 326. In some examples, inter-purchase interval data 326 may be extracted and/or derived from transaction data 321. In some implementations, membership computing device 102 may execute user attribute engine 306 to determine and generate, for each user, inter-purchase interval data 326 from transaction data 321. In some examples, inter-purchase interval data 326 may indicate the average number of days in-between each purchase made between the particular one of the customers of the e-commerce entity and the e-commerce entity (e.g., in-store and/or online). In other examples, inter-purchase interval data 326 may indicate a purchase regularity of the corresponding customer.

User database 320 may also store membership data 327. In some examples, membership computing device 102 may execute ingestion engine 302 to obtain, from an additional computing device and/or system (not shown in FIG. 3) associated with an associated e-commerce entity, one or more elements of membership data 327 and store the one or more elements of membership data 327 within user database 329. In some examples, the one or more elements of membership data 327 for a particular one of the full-membership user or customers may include, but are not limited to, a unique identifier of a particular one of the customers of the e-commerce entity that has currently or previously participated in the loyalty or membership program (e.g., an alphanumeric identifier or login credential, a customer name, etc.), a label or tag identifying whether the particular customer is currently or previously member, a timestamp indicating when the user joined the loyalty or membership program, information identifying the age of the full-membership, information identifying the sign up tenure type (e.g., annual or monthly), information identifying the full-membership plan type (e.g., delivery unlimited, in-home deliver, etc.), information identifying the remaining amount of time of a currently active membership of the particular customer, information identifying whether the particular one of the customers cancelled their respective loyalty or membership program, and a corresponding cancellation tag or label indicating whether the customer explicitly cancelled or let their full-membership lapse.

Additionally, data repository 116 many include a membership database 340. In some examples, membership database 340 may store benefits data 340B. In some examples, membership computing device 102 may obtain, from an additional computing device and/or system (not shown in FIG. 3) associated with an associated e-commerce entity, one or more elements of benefits data 340B and store the one or more elements of benefits data 340B within membership database 340. The one or more elements of benefits data 340B may, for each of the one or more stores, identify one or more membership benefits that are available to customers or are accessible to customers, such as scan and go and fuel discounts. Examples of benefits data 340B include, but are not limited to, a unique identifier of a particular one of the stores of the e-commerce entity, such as store 109 (e.g., an alphanumeric identifier), geolocation data of the particular store (e.g., an address and/or longitudinal and latitudinal coordinates), and a description or a tag/label of each membership benefit available to the customers or are accessible to the customers at that particular store.

Data repository 116 may include store data 345 of one or more stores associated with membership system 100, such as store 109. In some instances, membership computing device 102 may execute ingestion engine 302 to obtain, from a particular one of the one or more stores, one or more elements of data store 345 of the particular store. Additionally, executed ingestion engine 302 may store the one or more elements of data store 345 of the particular store to data repository 116. In some examples, store data 345 may indicate one or more store features or characteristics of a particular one of the one or more stores, such as store 109. For example, a store feature of store 109 may include that store 109 is scan and go capable. In another example, a store feature of 109 may include that store 109 is pickup capable. In yet another example, a store feature of 109 may include that store 109 has available fuel stations. Further, membership computing device 102 may store in data repository 116, data characterizing, the store features or characteristics of the particular store, such as store 109, within a corresponding data repository 116, such as membership data.

In some examples, membership computing device 102 may determine what membership benefits are available for a particular one of the one or more stores associated with the e-commerce entity based on the store data 345 of the particular store. In such examples, benefits data 340B may identify all the membership benefits that are provided by the associated e-commerce entity. Additionally, membership computing device 102 may execute membership engine 308 to compare the store features of the particular store with all the membership benefits identified in benefits data 340B. Based on the comparison, executed membership engine 308 may identify one or more membership benefits that are specific to the particular store. For instance, executed membership engine 308 may determine that fuel discounts (the membership benefits) are available to store 109 because the identified store features of store 109 includes fuel pumps. Further membership engine 308 may generate one or more data elements that include a description or tag/label of the identified one or more membership benefits that are specific to store 109 and store the one or more data elements within corresponding membership database 340, such as benefits data 340B. In various examples, the one or more data elements may further include, a unique identifier of store 109 (e.g., an alphanumeric identifier), and geolocation information of store 109 (e.g., an address and/or longitudinal and latitudinal coordinates).

Data repository 116 may include machine learning database 350. Machine learning database may store machine learning data 350A of one or more machine learning models (e.g., neural network based, multilayer perceptron based, etc). The machine learning models, that when adaptively trained and validated, may be executed by membership computing device 102 to determine and generate output data 328 associated with a particular user or customer labeled or designated as a current full-membership user (e.g., customer or user of an e-commerce entity currently participating in a loyalty or membership program of the e-commerce entity). In some examples, membership computing device 102 may execute membership engine 308 to implement a set of operations to generate the output data 328. The set of operations may include identifying one or more user identifiers of current full-membership users or customers based on membership data 327. Additionally, based on the user identifiers of the current full-membership user or customers, executed membership engine 308 may obtain one or more extracted, derived and obtained features or data associated with the user identifiers of the current full-membership user or customers. Examples of the one or more extracted, derived and obtained features or data associated with the user identifiers of the current full-membership user or customers include transaction data 321, engagement data 322, supplemental user data 323, consolidated data 324, fulfillment data 325, inter-purchase interval data 326, membership data 327 and/or benefits data 340B associated with the one or more user identifiers of current full-membership user or customers. Further executed membership engine 308 may apply a trained and validated machine learning model, such as logistic regression, decision tree process, random forest, a gradient boosted decision tree process (e.g., an XGBoost model) or a light gradient boosted model, to one or more extracted, derived and obtained features or data (e.g., transaction data 321, engagement data 322, supplemental user data 323, consolidated data 324, fulfillment data 325, inter-purchase interval data 326, benefits data 340B, and membership data 327) associated with the user identifiers of the current full-membership user or customers.

Further, executed membership engine 308 may store output data 328 within user database 320. Output data 328 may be associated with a particular user or customer labeled or designated as current full-membership user. Additionally, output data 328 may include a plurality of churn scores. Each churn score of the plurality of churn scores may be associated with a particular user or customer of an ecommerce entity and may characterize a likelihood of an occurrence of a churn event of a full-membership user. In various examples, the output data may further include data identifying a particular churn event associated with a particular churn score. In some examples, the churn event may be associated with a corresponding current full-membership user explicitly cancelling their respective membership prior to the end of their membership period. In other examples, the churn event may, for a corresponding current full-membership user, be associated with a respective membership lapsing expiring without the corresponding current full-membership user renewing the respective membership by the end of the membership period.

In various implementations, membership engine 308 may perform operations that adaptively train a machine-learning or artificial-intelligence process/model to determine a likelihood of an occurrence of a churn event of a particular current full-membership user and the particular type of churn event (e.g., explicit cancellation of the corresponding membership or lapsing/expiring membership without renewal). Additionally, membership engine 308 may adaptively train the machine-learning or artificial-intelligence process/model using training datasets associated with a first prior temporal interval (e.g., a "training" interval). In some examples the training datasets may be obtained from the extracted, derived or obtained data elements of transaction data 321, engagement data 322, supplemental user data 323, consolidated data 324, fulfillment data 325, inter-purchase interval data 326, membership data 327, benefits data 340B and store data 345. Additionally, the obtained data elements of the extracted, derived or obtained data elements of transaction data 321, engagement data 322, supplemental user data 323, consolidated data 324, fulfillment data 325, inter-purchase interval data 326, membership data 327, benefits data 340B and store data 345, may be of a first prior temporal interval.

Moreover, executed membership engine 308 may validate the adaptively trained machine-learning or artificial intelligence process/model using validation datasets associated with a second, and distinct, prior temporal interval. In some examples, the validation datasets may be obtained from the extracted, derived or obtained data elements of transaction data 321, engagement data 322, supplemental user data 323, consolidated data 324, fulfillment data 325, inter-purchase interval data 326, membership data 327, benefits data 340B and store data 345. Additionally, the obtained elements of the extracted, derived or obtained data elements of transaction data 321, engagement data 322, supplemental user data 323, consolidated data 324, fulfillment data 325, inter-purchase interval data 326, membership data 327, benefits data 340B and store data 345 may be of a second and distinct prior temporal interval. In various examples, executed membership engine 308 may validate the predictive capability and accuracy of the adaptively trained machine learning process/model based on elements of ground truth data incorporated within the validation datasets, or based on one or more computed metrics (that is based on the generated elements of output data and corresponding ones of validation datasets), such as, but not limited to, computed precision values, computed recall values, and computed area under curve (AUC) for receiver operating characteristic (ROC) curves or precision-recall (PR) curves. Once the machine learning model is trained and validated, executed membership engine 308 may store the trained and validated machine learning model in machine learning model database 350.

Machine learning database 350 may store data of feature importance type models to determine and assess the contributions of each extracted, derived or obtained feature inputted into the trained and validated machine learning model that generated output data 328. In various implementations, machine learning database 350 may store SHAP model data 350B of a SHAP model. In such implementations, membership computing device 102 may execute explainability engine 310 to apply the SHAP model to the trained and validated machine learning model that generated output data 328.

User database 320 may also store explainability data 329. Explainability data 329 may include a set of values and the set of values may include multiple subsets of values. Each subset of values may be associated with one of the extracted features or data that were inputs to a trained and validated machine learning model that generated output data 328 of a particular current full-membership user/customer. Moreover, each value of a subset of values may be associated with a particular current full-membership user/customer, and may characterize a contribution of the corresponding feature to the output data generated by the trained and validated machine learning model. In some examples each value may each indicate the magnitude of the contribution the corresponding feature may have had on output 328 of the particular current full-membership user/customer generated by the trained and validated machine learning model. Additionally, each value may indicate whether such contribution may have had a negative or positive contribution to the output 328. In some examples, membership computing device 102 may implement a set of operations that generate the explainability data 329. In some instances, membership computing device 102 may execute explainability engine 310 to generate explainability data 329. In other instances, membership computing device 102 may apply a SHAP model to the trained and validated machine learning model.

In various implementations, executed explainability engine 310 may generate explainability data 329 for a current full-membership user that are more likely to churn. In such implementations, executed membership engine 308 may, for each current full-membership user or customer of the e-commerce entity, associate with or place into one of a set of bins/cohorts. The placement or association of a current full-membership user to a particular one of the set of bins/cohorts may be based on output data 328 of the current full-membership user, such as the corresponding churn score of the corresponding current full-membership user or customer. Each bin/cohort may correspond to a predetermined range of churn scores. For example, a first cohort of 0.0-0.099 may correspond to current full-membership user with a determined churn score ranging between 0.0-0.099; a second cohort of 0.1-0.199 may correspond to current full-membership users with a determined churn score ranging between 0.1-0.199; a third cohort of 0.2-0.299 may correspond to current full-membership users with a determined churn score ranging between 0.2-0.299; a fourth cohort of 0.3-0.399 may correspond to current full-membership users with a determined churn score ranging between 0.3-0.399; a fifth cohort of 0.4-0.499 may correspond to current full-membership users with a determined churn score ranging between 0.4-0.499; a sixth cohort of 0.5-0.599 may correspond to current full-membership users with a determined churn score ranging between 0.5-0.599; a seventh cohort of 0.6-0.699 may correspond to current full-membership users with a determined churn score ranging between 0.6-0.699; an eighth third cohort of 0.7-0.799 may correspond to current full-membership users with a determined churn score ranging between 0.7-0.799; a ninth cohort of 0.8-0.899 may correspond to current full-membership users with a determined churn score ranging between 0.8-0.899; and a tenth cohort of 0.9-1.0 may correspond to current full-membership users with a determined churn score ranging between 0.9-1.0. Further, and in such implementations, executed explainability engine 310 may generate explainability data for current full-membership users in bins/cohorts which a predetermined range of churn scores above 0.5 or (50%). Additionally, membership computing device 102 may store in data repository 116, the explainability data, within a corresponding data repository 116, such as explainability data.

In some examples, membership computing device 102 may implement a set of operations that determine and generate explainability data 329 for a particular one of a set of bins/cohorts. For example, following the example above, membership computing device 102 may determine explainability data 329 for a second cohort of 0.6-0.699. Additionally, the explainability data 329 may include a set of values associated with output data 328 including churn scores ranging between 0.6-0.699 and the set of values may include multiple subsets of values. Each of the multiple subset of values may be associated with one of the extracted, derived or obtained features or data that were inputs to the trained and validated machine learning model that generated output data 328 including churn scores ranging between 0.6 and 0.699. Moreover, each value of a subset of values may be associated with a particular current full-membership user (e.g., user identifier of the particular current full-membership user), and may characterize a contribution of the corresponding extracted, derived or obtained features or data to the generated churn scores ranging between 0.6-0.699. In some examples the values may each indicate the magnitude of the contribution the corresponding feature may have had on such churn scores, as well as whether such contribution may have had a negative or positive contribution to such churn scores. In some instances, executed explainability engine 310 may apply a SHAP model to the trained and validated machine learning model that generated output data associated with a particular bin/cohort, such as a bin/cohort that corresponds to a churn score ranging from 0.6-0.699. The SHAP model may generate explainability data 329 for the particular bin/cohort. In such instances, the explainability data 329 may include a set of values, such as Shapley values.

In some examples, executed explainability engine 310 may implement a set of operations that determine and generate explainability data 329 for a particular current full-membership user/customer. For example, executed explainability engine 310 may determine explainability data 329 for a particular current full-membership user/customer with output data 328 including a churn score of 0.85. Additionally, the explainability data 329 may include a set of values associated with the output data 328 of the particular full-membership customer (e.g., output data 328 that includes the churn score of 0.85). Moreover, each value of the set of values may be associated with each of the extracted, derived or obtained features or data that were inputs to the trained and validated machine learning model that generated the churn score of the particular current full-membership user (e.g., churn score of 0.85). In such an example, the extracted, derived or obtained features or data may be associated with the particular current full-membership user. Further, each value may characterize a contribution of the corresponding extracted, derived or obtained feature or data to the generated churn score associated with the particular current full-membership user (e.g., churn score of 0.85). In some examples the values may each indicate the magnitude of the contribution the corresponding extracted, derived or obtained feature may have had on the churn score associated with the particular current full-membership user, as well as whether such contribution may have had a negative or positive contribution to the churn score associated with the particular current full-membership user. In some instances, executed explainability engine 310 may apply a SHAP model to the trained and validated machine learning model that generated output data of the particular current full-membership user. The SHAP model may generate explainability data 329 associated with the particular current full-membership user. In such instances, the explainability data 329 may include a set of values, such as Shapley values.

For each feature and associated explainability data 329 of a particular one of current full-membership users (including the associated set of values), membership computing device 102 may determine whether to implement operations associated with a feature determined to be actionable. As described herein, an actionable feature, is an extracted, derived, or obtained feature of the particular current full-membership user that, is modifiable through operations implemented by the executed activations engine 312. Additionally, if the extracted, derived or obtained feature is modified, the modification of such feature may increase or decrease a churn score. Examples of actionable features include, transactional and engagement type features or features that are extracted, obtained or derived from transaction data 321 and engagement data 322.

Further, membership computing device 102 may execute activations engine 312 to determine whether to implement operations associated with an actionable feature by comparing explainability data 329 of a particular current full-membership user with a particular churn score to the explainability data 329 of a bin/cohort with a higher range of churn scores. For example, executed activations engine 312 may compare a distribution of values of explainability data 329 associated with extracted, derived, or obtained features and data of a first churn bin/cohort with a corresponding first range of churn scores to the values of explainability data 329 associated with extracted, derived, or obtained features and data of a particular one of the current full-membership users. The particular current full-membership user may be associated with a second bin/cohort with corresponding second range of churn scores, and the second range of churn scores may be a lower range than the first range of churn scores. Executed activations engine 312 may identify, for each extracted, derived or obtained features of the first churn bin/cohort, portions of the distribution of corresponding values that positively affect the corresponding first range of churn scores or positive portion(s), portions of the distribution of corresponding values that are negatively affect the corresponding first range of churn scores or negative portion of values portion, and an inflection point (the point in the distribution of corresponding values of a particular extracted, derived, or obtained features of the first bin that begin to change from positively to negatively contributing to the first range of churn scores, or vice-versa). Further, based on the comparison, the identified positive portions, the identified negative portions and the identified inflection point, executed activations engine 312 may, for a particular actionable feature of the extracted, derived, or obtained features of the first churn cohort/bin, determine whether, the corresponding value of the particular current full-membership user is within the identified negative portion or the identified positive portion.

In examples where, for a particular actionable feature, executed activations engine 312 determines the corresponding value of the particular current full-membership user is within the negative portion, executed activations engine 312 may implement a set of operations associated with the particular actionable feature. Otherwise, executed activations engine 312 may not implement operations associated with the particular actionable feature. For example, executed activations engine 312 may determine that, for a particular current full-membership user, a value of a particular actionable feature associated with the number of scheduled deliveries is within the negative portion associated with the actionable feature associated with the number of scheduled deliveries. For instance, the feature value of the actionable feature associated with the number of scheduled deliveries and the particular current full-membership user is within the portion of the distribution of values associated with such actionable feature and the first churn bin/cohort that is determined as negatively effecting the corresponding first range of churn scores.

In various examples, operations implemented by executed activations engine 312 may be associated with a particular actionable feature (e.g., scheduled deliveries). In such examples, the operations implemented by executed activations engine 312 may be based on and/or in response to executed activations engine 312 determining whether, for the particular actionable feature, the corresponding value of the explainability data 329 of a particular current full-membership user is within a negative or positive portion of the corresponding distribution of values of the explainability data 329 of a churn bin/cohort. Additionally, the churn bin/cohort may have a higher range of churn scores that the churn score of the particular current full-membership user. For example, for a particular actionable feature, number of scheduled deliveries, executed activations engine 312 determines the corresponding value of a particular current full-membership user is determined as being within corresponding a negative portion associated with a second bin/cohort with a higher range of churn scores than the particular current full-membership user. As such, based on such determinations, executed activations engine 312 may implement a set of operations associated with the particular actionable feature, the number of scheduled deliveries.

In some examples, the set of operations that are associated with a particular actionable feature may include, executed activations engine 312 communicating notification instructions to a mobile computing device (e.g., mobile computing device 110, 112, 114) of the particular current full-membership user. The notification instruction may cause the mobile computing device of the particular current full-membership user to generate a notification that includes content related to discounted or free scheduled deliveries. In other examples, such operations include, executed activations engine 312 communicating notification instructions to a mobile computing device (e.g., mobile computing device 110, 112, 114) of the particular current full-membership user. The notification instruction may cause the mobile computing device of the particular current full-membership user, while the particular current full-membership user is browsing on a retailer website associated with an associated e-commerce entity user, to generate a notification (e.g., as a pop up notification, banner, etc.) that includes content related to discounted or free scheduled deliveries. In various examples, the operations may include, executed activations engine 312 causing communication (either directly or indirectly through communications with another computing system) of an email to the mobile computing device (e.g., mobile computing device 110, 112, 114) of the particular current full-membership user that includes content related to discounted or free scheduled deliveries. Additionally, or alternatively, the content may be related generally to the benefits of the loyalty or membership program. For example, along with the content regarding the discounted or free scheduled deliveries, a notification or email communicated to the mobile computing device of the particular current full-membership user may also include content regarding the benefits of the loyalty or membership program (e.g., savings that may be available to the particular current full-membership user).

In various examples, operations that executed activations engine 312 may implement for a particular actionable feature may be directed to increase the engagements between a corresponding current full-membership user and an associated e-commerce entity. For example, executed activations engine 312 may determine that, for a particular current full-membership user, a value of a particular actionable feature associated with the inter-purchase interval is within a negative portion of the corresponding distribution of values of the explainability data 329 of a second churn bin/cohort. The second churn bin/cohort may have a higher range of churn scores than the churn score of the particular current full-membership user. Additionally, based on such a determination, executed activations engine 312 may implement operations associated with the particular actionable feature associated with the inter-purchase interval.

In some examples, executed activations engine 312 may communicate with one or more multiple computing systems 118, 120 and 122 to implement the set of operations associated with a particular actionable feature. In such examples, each of the multiple computing systems 118, 120 and 122 may be associated with a particular activations system. A particular activations system may be configured to, along with the executed activations engine 312, implement a set of operations associated with one or more particular extracted, derived or obtained actionable feature. For example, following the example above, for a particular actionable feature, executed activations engine 312 may determine the corresponding value of the particular current full-membership user of a first churn bin/cohort is within a negative portion of the corresponding distribution of values of the explainability data 329 of a second churn bin/cohort. The second churn bin/cohort may have a higher range of churn scores than the particular current full-membership user. Based on such determinations, executed activations engine 312 may generate an intervention data indicating that, for the particular actionable feature, the corresponding value of the particular current full-membership user is within a negative portion of the second churn bin/cohort. Additionally, executed activations engine 312 may identify the corresponding activations system, multiple computing system 118, 120, and 122, to implement the set of operations associated with the particular actionable feature. Further, executed activations engine 312 may generate and transmit the intervention data to the identified activations system to cause the identified activations system to implement a set of operations associated with the particular actionable feature.

For example, computing system 118 of the activation engine, may generate and communicate instructions that cause an application executing on a mobile computing device (e.g., mobile computing device 110, 112, 114) of the particular current full-membership user to generate promotional content associated with the particular actionable feature, in response to and/or based in part on the intervention data. Further, the promotional content may include content items that promotes or encourages the current full-membership user to maintain or renew their membership.

In some examples, executed activations engine 312 may implement the set of operations that are associated with the particular actionable feature. In such examples, one or more of the activations systems associated with the e-commerce entity (or membership system 100), such as computing system 118, 120, 122, may provide additional data that may be utilized by executed activations engine 312 when implementing the set of operations. For example, for a particular actionable feature, executed activations engine 312 may determine the corresponding value of the particular current full-membership user of a first churn bin/cohort is within a negative portion of the corresponding distribution of values of the explainability data 329 of a second churn bin/cohort. The second churn bin/cohort may have a higher range of churn scores than the particular current full-membership user. Additionally, based on such determinations, executed activations engine 312 may generate and transmit intervention data to the corresponding activations system, such as computing system 118, along with a user identifier associated with the particular current full-membership user and transaction data 321 and engagement data 322 associated with the particular current full-membership user. As described herein, intervention data may cause the corresponding activations system to implement a set of operations associated with the particular actionable feature. Further, in response to receiving the intervention data, the user identifier of the particular current full-membership user and the transaction data 321 and engagement data 322 of the particular current full-membership user, computing system 118 may generate data identifying one or more items the particular current full-membership user may want to purchase at a future time interval, and is also related to the particular actionable feature. Additionally, the computing system 118 may generate data identifying the one or more items and transmit such data to membership computing device 102. Based in part on the data identifying the one or more items, executed activations engine 312 may implement a set of operations associated with the particular actionable feature. The set of operations may include generating and communicating instructions that cause a webpage or website, that a current full-membership user may be browsing, to display promotional content associated with a particular actionable feature. In some instance, the promotional content may include content items that are associated with the one or more items the current full-membership user may want to purchase at a future time interval and promotes or encourages the current full-membership user maintain or renew their membership.

Methodology

Figure 4:
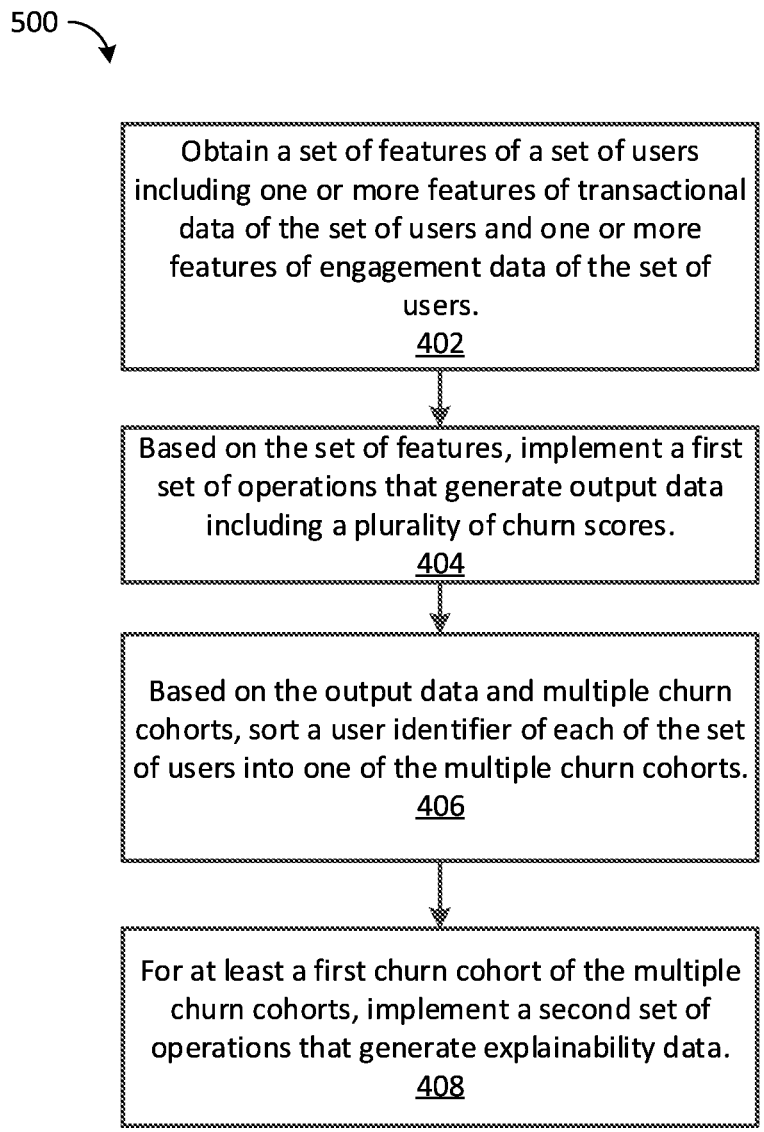
FIG. 4 illustrates an example method that can be carried out by the membership computing device 102 of FIG. 1.
Figure 5:
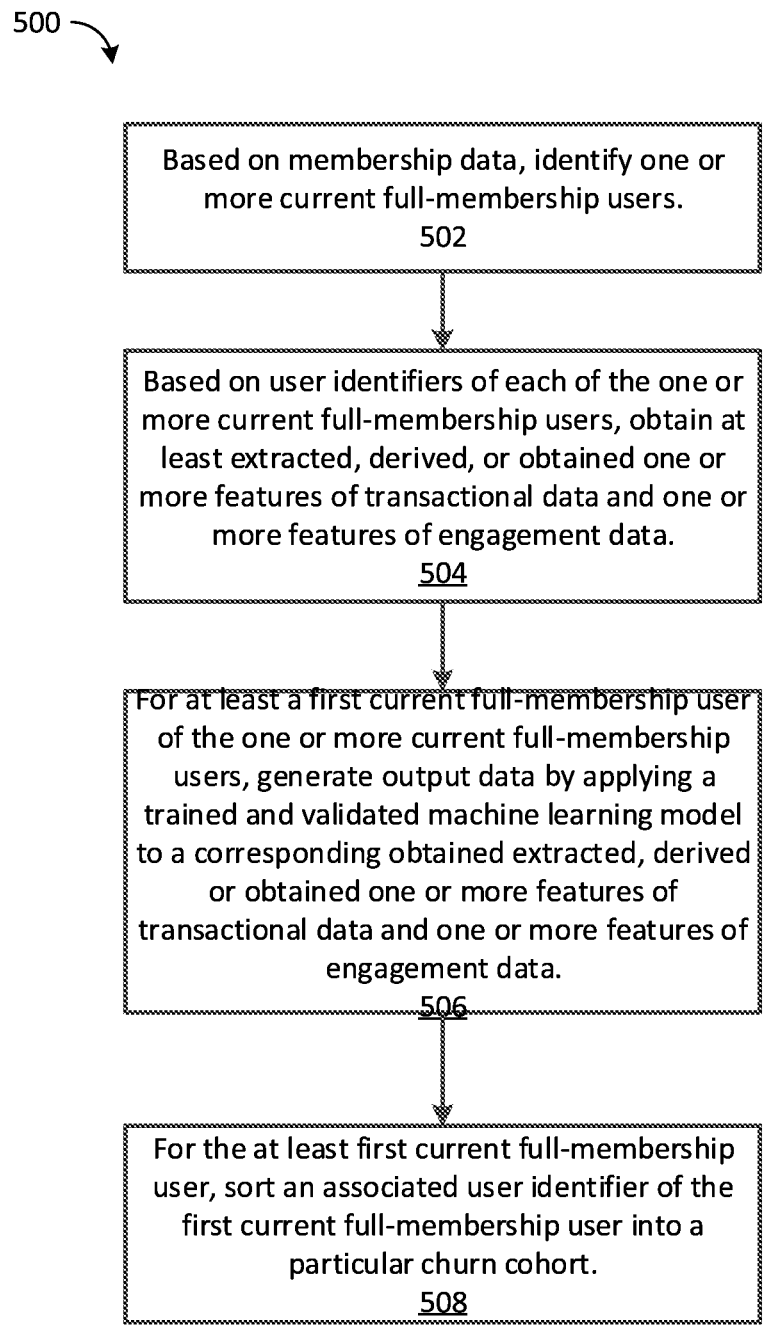
FIG. 5 illustrates an example method that can be carried out by the membership computing device 102 of FIG. 1.
Figure 6:
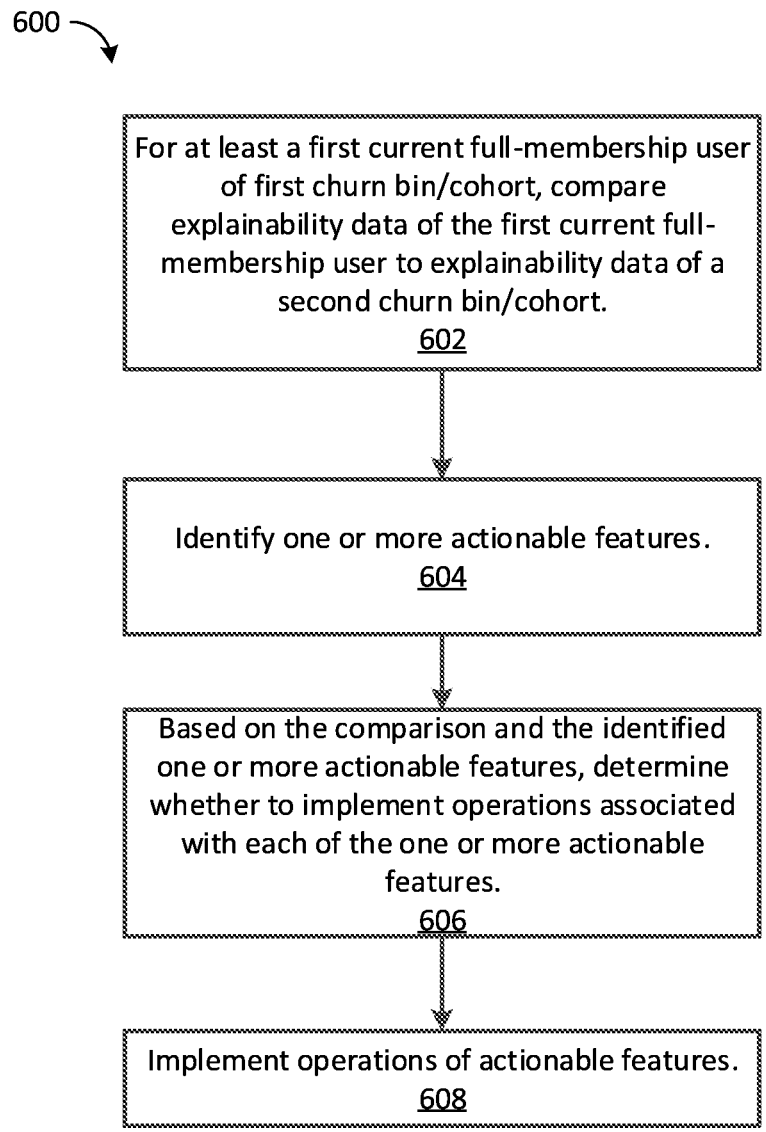
FIG. 6 illustrates an example method that can be carried out by the membership computing device 102 of FIG. 1.

FIG. 4 illustrates an example method that can be carried out by the membership computing device 102 of FIG. 1. FIG. 5 illustrates an example method that can be carried out by the membership computing device 102 of FIG. 1. FIG. 6 illustrates an example method that can be carried out by the membership computing device 102 of FIG. 1. In describing an example method of FIGS. 4, 5, and 6, reference is made to elements of FIG. 1-3 for purpose of illustrating a suitable component for performing a step or sub-step being described.

With reference to example method 400 of FIG. 4, membership computing device 102 may, obtain a set of features of a set of users including one or more features of transaction data 321 of the set of users and one or more features of engagement data 322 of the set of users (402). In some examples, membership computing device 102 may execute membership engine 308 to obtain one or more extracted, derived and obtained features or data, such as features of transaction data 321 and engagement data 322 (e.g., supplemental user data 323, consolidated data 324, fulfillment data 325, inter-purchase interval data 326, click data 322B, add-to-cart data 322C, impressions data 322D, views data 322E, search query data 322F), associated with the user identifiers of the set of user. In other examples, the set of users may be current full-membership users.

Additionally, based on the set of features, membership computing device 102, may implement a first set of operations that generate output data 328 including a plurality of churn scores associated the set of users (404). In some examples, executed membership engine 308 may implement a first set of operations that generate output data 328 including a plurality of churn scores associated with the set of users, based on the set of features. In various examples, the output data may further include data identifying a particular churn event associated with a particular churn score. In some examples, the churn event may be associated with a corresponding current full-membership user explicitly cancelling their respective membership prior to the end of their membership period. In other examples, the churn event may, for a corresponding current full-membership user, be associated with a respective membership lapsing expiring without the corresponding current full-membership user renewing the respective membership by the end of the membership period. Additionally, the set of operations may include applying a trained and validated machine learning model, such as logistic regression, decision tree process, light gradient boosted model, random forest or a gradient boosted decision tree process (e.g., an XGBoost model), to one or more extracted, derived and obtained features or data (e.g., transaction data 321, engagement data 322, supplemental user data 323, consolidated data 324, fulfillment data 325, inter-purchase interval data 326, membership data 327, and benefits data 340B) associated with the set of users.

Moreover, based on the output data and multiple churn cohorts, membership computing device 102 may sort a user identifier of each of the set of users into one of the multiple churn cohorts (406). In some examples, based on a churn score of each corresponding user of the set of users, executed membership engine 308 may place or associate a user identifier of each of the set of users into one of the multiple churn cohorts or bins. Each bin/cohort may correspond to a predetermined range of churn scores.

Further, for at least a first churn cohort of the multiple churn cohorts, membership computing device 102 may implement a second set of operations that generate explainability data 329 (408). In some examples, explainability data 329 may include a set of values and each value of the set of values may be associated with each of the set of features. Additionally, each value of the set of values may characterize a contribution of the corresponding feature to the churn scores associated with at least the first churn cohort. In some instances, membership computing device 102 may execute explainability engine 310 to implement the second set of operations that generate the explainability data 329. Additionally, the second set of operations may include applying a feature importance type model, such as a SHAP model, to the trained and validated machine learning model that generated the output data 328 associated with the first churn cohort.

With reference to example method 500 of FIG. 5, membership computing device 102 may implement a set of operations to generate output data 328 that includes based on membership data 327, identifying one or more current full-membership users (502) or a set of current full-membership users. In some examples, membership computing device 102 may execute membership engine 308 to determine and identify current full-membership users/customers. As described herein, the current full-membership users/customers are users/customers of the e-commerce entity that are determined or identified as currently participating in a loyalty or membership program of the e-commerce entity, based on membership data 327.

Additionally, based on user identifier of each of the one or more current full-membership users, membership computing device 102 may obtain at least one or more extracted, derived, or obtained features or data of transaction data 321, and features or data of engagement data 322 (504) associated with each of the one or more current full-membership users. In some examples, executed membership engine 308 may obtain at least one or more extracted, derived, or obtained one or more features or data of transaction data 321, and one or more features or data of engagement data 322 associated with the user identifier of each of the one or more current full-membership users.

Moreover, for at least a first current full-membership user of the one or more current full-membership users, membership computing device 102 may generate output data 328 by applying a trained and validated machine learning model to a corresponding extracted, derived or obtained one or more features or data of the transaction data 321 and one or more features or data of the engagement data 322 (506). In some examples, executed membership engine 308 may apply a trained and validated machine learning model, such as logistic regression, decision tree process, random forest, a gradient boosted decision tree process (e.g., an XGBoost model) or a light gradient boosted model, to the extracted, derived or obtained one or more features or of the transaction data 321 and one or more features of the engagement data 322.

Further, for at least the first current full-membership user, membership computing device 102 may sort an associated user identifier of the first current full-membership user into a particular churn cohort (508). In such examples the particular churn cohort may correspond to a particular predetermined range of churn scores. Additionally, based on the output data 328 of the first current full-membership user, executed membership engine 308 may place or associate the first current full-membership user into a particular churn cohort/bin where the churn score of the first current full-membership user is within the range of churn scores corresponding to the particular churn cohort/bin. For example, the churn score of the first current full-membership user may be 0.712. Additionally, executed membership engine 308 may place the identifier of the first current full-membership user into a particular cohort/bin with a corresponding churn scores ranging between 0.7 and 0.799.

With reference to example method 600 of FIG. 6, membership computing device 102 may determine, for at least a first current full-membership user of a first churn bin/cohort, whether to implement operations associated with an actionable feature. For example, membership computing device 102 may make such a determination by comparing explainability data 329 of the first current full-membership user to explainability data of a second churn bin/cohort (602). In some examples, first current full-membership user may be associated with a first churn bin/cohort with corresponding first range of churn scores that is lower than a second range of churn scores corresponding to the second churn bin/cohort. In such examples, membership computing device 102 may execute activations engine 312 to compare distribution of values of explainability data 329 associated with extracted, derived, or obtained features and data of the second churn bin/cohort to the values of explainability data 329 associated with extracted, derived, or obtained features and data of the first current full-membership user. In some examples, executed activations engine 312 may identify, for each extracted, derived or obtained features of the second churn bin/cohort, portions of the distribution of corresponding values that positively affect the corresponding second range of churn scores or positive portion(s), portions of the distribution of corresponding values that are negatively affect the corresponding second range of churn scores or negative portion of values portion, and an inflection point (the point in the distribution of corresponding values of a particular extracted, derived, or obtained features of the second bin that begin to change from positively to negatively contributing to the second range of churn scores, or vice-versa).

Moreover, membership computing device 102 (e.g., executed activations engine 312) may identify one or more actionable features (604), based on the extracted, derived or obtained feature and data of the second churn bin/cohort and the first current full-membership user. As described herein an actionable feature, is an extracted, derived, or obtained feature of the particular current full-membership user that, are modifiable through operations implemented by the executed activations engine 312. Additionally, if the extracted, derived or obtained feature is modified, the modification of such feature may increase or decrease a churn score. Examples of actionable features include, transactional and engagement type features or features that are extracted, obtained or derived from transaction data 321 and engagement data 322 (e.g., features or data of consolidated data 324, fulfillment data 325, and inter-purchase interval data 326).

Further, based on the comparison and for the identified one or more actionable features, membership computing device 102 may determine whether to implement operations associated with each of the one or more actionable features (606). In some examples, executed activations engine 312 may, based on the comparison, the identified positive portions, the identified negative portions and the identified inflection point, and for a particular identified actionable feature of the extracted, derived, or obtained features of the second churn cohort/bin, determine whether, the corresponding value of the first current full-membership user is within the identified negative portion or the identified positive portion. Further, executed activations engine 312 may determine whether to implement operations associated with the particular identified actionable feature, based on whether the corresponding value of the first current full-membership user is within the identified negative portion or the identified positive portion.

Membership computing device 102 may implement operations of actionable features (608) that are determined as being within the negative portion of the second churn bin/cohort. In some examples, executed activations engine

312 may, for a particular one of the one or more actionable features, determine the corresponding value of the first current full-membership user is within the negative portion of the second churn bin/cohort. Additionally, based on such a determination, executed activations engine 312 may implement a set of operations associated with the particular actionable feature.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a communications interface;
a memory resource storing instructions; and
at least one processor coupled to the communications interface and to the memory, the at least one processor being configured to execute the instructions to:
adaptively train a machine learning model using training datasets associated with a first prior temporal interval, based on at least one of: a light gradient boosted model, a random forest or a gradient boosted decision tree process;
validate the machine learning model based on validation datasets associated with a second prior temporal interval that is distinct from the first prior temporal interval;
obtain a set of features of a set of users including one or more features of transaction of the set of users and one or more features of engagement data of the set of users;
based on the set of features, implement a first set of operations including applying the trained and validated machine learning model to the set of features to generate output data including a plurality of churn scores, each churn score of the plurality of churn scores being associated with a particular user of the set of users and characterize a likelihood of a churn event of the corresponding user;
based on the output data and multiple churn cohorts, sort a user identifier of each of the set of users into one of the multiple churn cohorts, each of the multiple churn cohorts representing one of multiple predetermined ranges of churn scores;
for a first churn cohort of the multiple churn cohorts, implement a second set of operations that generate first explainability data associated with the first churn cohort, wherein
the first explainability data includes a distribution of values characterizing contributions of an actionable feature of all users sorted into the first churn cohort to the churn scores in the first churn cohort,
the distribution of values comprises: (a) a positive portion including values that positively contribute to the churn scores in the first churn cohort, (b) a negative portion including values that negatively contribute to the churn scores in the first churn cohort, and (c) an inflection point separating the positive portion and the negative portion;
compare the distribution of values in the first explainability data associated with all users sorted into the first churn cohort to a corresponding value in second explainability data associated with a single user sorted into a second churn cohort of the multiple churn cohorts, wherein
the first churn cohort represents a first range of churn scores,
the second churn cohort represents a second range of churn scores,
the second range of churn scores is a lower range than the first range of churn scores;
identify, based on the comparing, whether the corresponding value is within the negative portion or the positive portion of the distribution; and
determine, based on the identifying, whether to implement operations associated with the actionable feature for the single user.

2. The system of claim 1, wherein the first explainability data includes a set of values, the set of values including multiple subset of values and each subset of values being associated with one of the set of features.

3. The system of claim 2, wherein each value of the set of values characterize a contribution of a corresponding feature to the churn scores associated with at least the first churn cohort.

4. The system of claim 1, wherein the output data further includes data characterizing a type of churn event associated with each of the plurality of churn scores.

5. The system of claim 1, wherein the at least one processor being configured to execute the instructions further to:
based on a churn score associated with a first user of the set of users associated with the first churn cohort, implement a third set of operations that generate explainability data associated with the first user.

6. The system of claim 1, wherein the second set of operations includes applying a SHAP model to the trained and validated machine learning model.

7. The system of claim 1, wherein the at least one processor being configured to execute the instructions further to:
obtain one or more features of supplemental user data of the set of users; and
wherein the implementation of the first set of operations that generate the output data is further based on the one or more features of supplemental user data.

8. The system of claim 1, wherein the at least one processor being configured to execute the instructions further to:
obtain features of membership data of the set of users; and
wherein the implementation of the first set of operations that generate the output data is further based on the features of membership data.

9. The system of claim 1, wherein the at least one processor being configured to execute the instructions further to:
determine at least a first actionable feature of a plurality of actionable features associated with the first churn cohort, each of the plurality of actionable features being associated with a computing system of a plurality of computing systems.

10. The system of claim 9, wherein the at least one processor being configured to execute the instructions further to:
for at least the first actionable feature, transmit instructions to a computing system associated with the first actionable feature causing the computing system to communicate data associated with the first actionable feature with at least a computing device of a user associated with the first churn cohort.

11. The system of claim 9, wherein each actionable feature of the plurality of actionable features being associated with each churn cohort of the multiple churn cohorts.

12. A computer-implemented method comprising:
adaptively training, by a processor, a machine learning model using training datasets associated with a first prior temporal interval, based on at least one of: a light gradient boosted model, a random forest or a gradient boosted decision tree process;
validating, by the processor, the machine learning model based on validation datasets associated with a second prior temporal interval that is distinct from the first prior temporal interval;
obtaining, by the processor, a set of features of a set of users including one or more features of transaction of the set of users and one or more features of engagement data of the set of users;
based on the set of features, implementing, by the processor, a first set of operations including applying the trained and validated machine learning model to the set of features to generate output data including a plurality of churn scores, each churn score of the plurality of churn scores being associated with a particular user of the set of users and characterize a likelihood of a churn event of the corresponding user;
based on the output data and multiple churn cohorts, sorting, by the processor, a user identifier of each of the set of users into one of the multiple churn cohorts, each of the multiple churn cohorts representing one of multiple predetermined ranges of churn scores;
for a first churn cohort of the multiple churn cohorts, implementing, by the processor a second set of operations that generate first explainability data associated with the first churn cohort, wherein
the first explainability data includes a distribution of values characterizing contributions of an actionable feature of all users sorted into the first churn cohort to the churn scores in the first churn cohort,
the distribution of values comprises: (a) a positive portion including values that positively contribute to the churn scores in the first churn cohort, (b) a negative portion including values that negatively contribute to the churn scores in the first churn cohort, and (c) an inflection point separating the positive portion and the negative portion;
comparing the distribution of values in the first explainability data associated with all users sorted into the first churn cohort to a corresponding value in second explainability data associated with a single user sorted into a second churn cohort of the multiple churn cohorts, wherein
the first churn cohort represents a first range of churn scores,
the second churn cohort represents a second range of churn scores,
the second range of churn scores is a lower range than the first range of churn scores;
identifying, based on the comparing, whether the corresponding value is within the negative portion or the positive portion of the distribution; and
determining, based on the identifying, whether to implement operations associated with the actionable feature for the single user.

13. The computer-implemented method of claim 12, wherein the first explainability data includes a set of values, the set of values including multiple subset of values and each subset of values being associated with one of the set of features.

14. The computer-implemented method of claim 13, wherein each value of the set of values characterize a contribution of a corresponding feature to the churn scores associated with at least the first churn cohort.

15. The computer-implemented method of claim 12, wherein the output data further includes data characterizing a type of churn event associated with each of the plurality of churn scores.

16. The computer-implemented method of claim 12, further comprising:
based on a churn score associated with a first user of the set of users associated with the first churn cohort, implementing a third set of operations that generate explainability data associated with the first user.

17. The computer-implemented method of claim 12, wherein the second set of operations includes applying a SHAP model to the trained and validated machine learning model.

18. A non-transitory computer readable medium storing instructions, that when executed by at least one processor, causes a system to:
adaptively train a machine learning model using training datasets associated with a first prior temporal interval, based on at least one of: a light gradient boosted model, a random forest or a gradient boosted decision tree process;

validate the machine learning model based on validation datasets associated with a second prior temporal interval that is distinct from the first prior temporal interval;

obtain a set of features of a set of users including one or more features of transaction of the set of users and one or more features of engagement data of the set of users;

based on the set of features, implement a first set of operations including applying the trained and validated machine learning model to the set of features to generate output data including a plurality of churn scores, each churn score of the plurality of churn scores being associated with a particular user of the set of users and characterize a likelihood of a churn event of the corresponding user;

based on the output data and multiple churn cohorts, sort a user identifier of each of the set of users into one of the multiple churn cohorts, each of the multiple churn cohorts representing one of multiple predetermined ranges of churn scores;

for a first churn cohort of the multiple churn cohorts, implement a second set of operations that generate first explainability data associated with the first churn cohort, wherein
the first explainability data includes a distribution of values characterizing contributions of an actionable feature of all users sorted into the first churn cohort to the churn scores in the first churn cohort,
the distribution of values comprises: (a) a positive portion including values that positively contribute to the churn scores in the first churn cohort, (b) a negative portion including values that negatively contribute to the churn scores in the first churn cohort, and (c) an inflection point separating the positive portion and the negative portion;

compare the distribution of values in the first explainability data associated with all users sorted into the first churn cohort to a corresponding value in second explainability data associated with a single user sorted into a second churn cohort of the multiple churn cohorts, wherein
the first churn cohort represents a first range of churn scores,
the second churn cohort represents a second range of churn scores,
the second range of churn scores is a lower range than the first range of churn scores;

identify, based on the comparing, whether the corresponding value is within the negative portion or the positive portion of the distribution; and determine, based on the identifying, whether to implement operations associated with the actionable feature for the single user.

* * * * *